July 5, 1932. R. J. NORTON 1,866,420
BRAKE DRUM
Filed Dec. 12, 1930
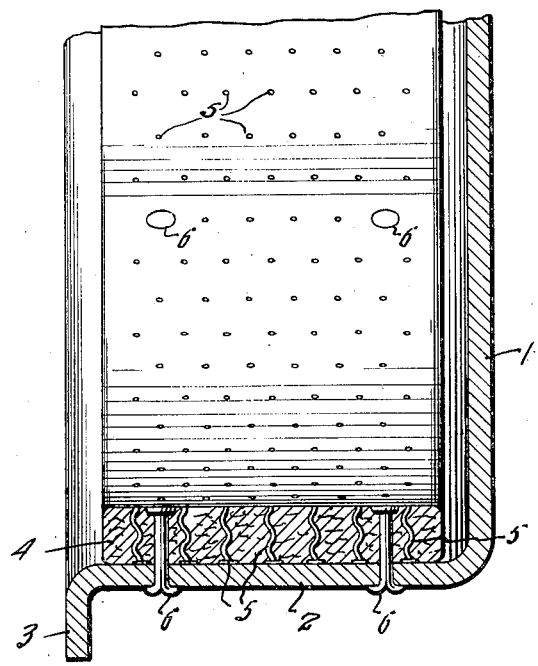
Inventor
RAYMOND J. NORTON Patented July 5, 1932

1,866,420

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE DRUM

Application filed December 12, 1930. Serial No. 501,862.

This invention relates to improved friction facings and more particularly to a friction facing comprising a synthetic resin.

Synthetic resins, in combination with either felted or woven asbestos, have been proposed heretofore for use in brake structures. These materials serve well as binders but are, nevertheless, subjected to certain disadvantages.

One of the major disadvantages is the low heat conductivity of such resins. The conductivity is so low that they are, in effect, substantially heat insulators. For this reason, when employed as friction facings, the generated heats of friction are not transmitted to the external metallic means and hence are not dissipated. This is a serious drawback when using these synthetic resins because of the fact that at high temperatures these materials suffer a loss in weight and if the temperature is too high, they carbonize.

Prior to this time, no attempt has been made to provide for the abstraction of heat from the friction surface of materials embodying synthetic resins, and to this extent these materials have not been effective in friction facings.

It is an object of the present invention to provide a novel metalloresin friction facing.

It is another object to provide a novel type of brake drum.

Yet another object is to provide a friction facing embodying a synthetic resin so fabricated as to impart to it a relatively high thermal conductivity.

Another object is to provide a friction facing embodying a synthetic resin which has substantially the heat conductivity of metal parts.

Yet another object is to provide a novel method of transmitting heat from the frictional engaging surfaces of brake members to a radiating or other dissipating surface.

With these and other equally important objects in view, the invention comprehends the provision of a friction facing embodying a synthetic resin, such, for example, as a resin of the phenol methylene type, with which is incorporated filler materials such as fabrics of low flammability exemplified by asbestos. In these materials there are incorporated metallic members which extend from the frictional engaging surface to the metal part of the drum so as to provide a path of high thermal conductivity from the frictional engaging surface to the dissipative surface.

The single figure in the drawing discloses one illustrative embodiment of the invention.

The invention may readily be practiced by reacting phenol and formaldehyde in the proper proportions and in the presence of hardening agents so as to produce the infusible form of the resin.

The resin may be made up first in a fusible form and then used to impregnate either woven asbestos or felted asbestos. After this impregnation, the material may be subjected to the proper heat and pressure conditions, well known to those skilled in the art, to transform the material to the infusible form. In lieu of this phenolic condensation product, other synthetic resins may be employed such, for example, as furfural, the acetylene resins, the urea resins, and other similar synthetic products.

In accordance with the present invention, the friction facing as made up includes metallic members preferably in the form of fine wires of low abrasive quality which are permanently embodied in the friction facing and which extend transversely of the friction surface, that is to say, from the friction engaging surface through the friction facing to the opposite side. The wires are preferably extended circumferentially along the surface of the facing which is contiguous to, and which, when mounted abuts the adjacent metallic flange of the drum. When these two members, namely, the drum and the facing, are secured together, either by rivets or by being permanently moulder together, the wires embodied in the friction facing contact with the metal of the drum and provide, in effect, a continuous metallic path from the heat generating surface to the heat dissipative surface. Heat may be dissipated from the drum by radiation and/or convection.

As illustrated in the drawing, the apparatus may comprise a brake drum having a drum head 1, a circumferential braking flange 2 and an integral marginal lip 3.

Secured to the braking flange is the improved friction facing 4. As noted hereinbefore, this is provided with a multiplicity of wires of relatively small gauge, indicated at 5, extending from the braking surface of the friction facing back to and contacting with the braking flange. As shown in the drawing, the metal of the wires is extended so as to form a mechanical contact of relatively large area with the drum. This construction insures the rapid conduction of heat away from the frictional engaging surface, where it is generated, to the metal of the braking flange and thence by convection and radiation it is dissipated to the atmosphere.

The lining may be attached to the drum in any desired manner, as by molding directly thereon or by mechanically attaching it, as for example by means of the securing means 6.

As noted hereinbefore, the invention is applicable either to friction facings of the woven or of the felted type. In either case, it is necessary only to provide for the presence, during any of the steps of manufacture, of metallic wires extending from the friction surface transversely of the friction facing to the abutting surface of a brake drum or brake shoe. It will be appreciated that the total quantum of heat which is transmitted will depend upon the coefficient of thermal conductivity of the metallic transmitting medium employed, and upon the quantity of the material. For this reason, it is preferable to use copper wire of a relatively small gauge which is substantially evenly distributed over the entire frictional engaging surface of the friction facing.

The operation of the member will be readily appreciated; as a brake is applied, and as the friction facing embodying the resin exerts its braking action, frictional heats are generated. These are transmitted through the medium of the wires or other metallic inserts to the metal of the drum. The heat then is dissipated by radiation and/or convection from the exterior surfaces.

It will be appreciated that with this concept in mind, a wide variety of particular facings may be made up. These may comprise relatively massive metal inserts, when the metal is relatively soft, or may comprise, as described, relatively fine wires. When fine wires are employed, the problem of differential expansion of the metal and the resin of the friction facing is largely minimized due to the actual negligible expansion of the small cross section wire.

Therefore, while a particular embodiment of the invention has been described, it is to be understood that this is merely illustrative of the novel principle here involved, namely, of providing a friction material embodying, at least in part, a synthetic resin or other material of low thermal conductivity but which is so formed as to provide a member having a thermal conductivity approximating that of a metal structure.

I claim:

1. A brake drum comprising a head and circumferential flange of a metal and a resin lining attached to the flange to form the frictional engaging surface, said lining having inserts of high thermal conductivity extending therethrough.

2. A brake drum comprising a head and circumferential flange of a metal and a resin lining attached to the flange to form the frictional engaging surface, said lining having inserts of high thermal conductivity extending therethrough and contacting with the metal of the flange.

3. A brake drum comprising a metal braking flange, a molded non-metallic friction member secured to the flange and having metallic heat conductors extending therethrough.

4. A brake drum comprising a head and circumferential flange of metal, a non-metallic friction surface attached to the flange, said friction surface being composed of a resin bonded fibrous material having elements of high thermal conductivity extending from the frictional engaging surface to the metal of the braking flange.

5. A brake drum comprising a head and circumferential flange of metal, a resinoid friction material attached to the flange and having soft metal conductors extending from the frictional engaging surface to the metal of the flange so as to provide a path of high thermal conductivity from the frictional engaging surface to the heat dissipating section of the drum.

6. A brake drum comprising a metallic flange and a non-metallic friction facing attached to said flange and having highly heat conductive material incorporated therein and extending from the frictional engaging surface of the friction facing to the opposite face thereof to conduct heat therethrough.

7. A brake drum comprising a circumferential flange of metal and a resinoid friction material attached to the flange and having incorporated therein a highly heat conductive material extending from the frictional engaging surface of said friction material to the metal of the flange, to conduct heat from said frictional engaging surface.

In testimony whereof, I have signed my name.

RAYMOND J. NORTON.